(12) United States Patent
Stewart et al.

(10) Patent No.: US 6,227,780 B1
(45) Date of Patent: May 8, 2001

(54) PROTECTIVE CARGO SUPPORT DEVICE

(76) Inventors: Mark D. Stewart; Joy A. Stadler, both of 46-9132 120th Street, Surrey, BC (CA), V3V 4B6

( * ) Notice: Subject to any disclaimer, the term of this patent is extended or adjusted under 35 U.S.C. 154(b) by 0 days.

(21) Appl. No.: 09/548,248

(22) Filed: Apr. 12, 2000

(51) Int. Cl.[7] .................................................. B60P 7/08
(52) U.S. Cl. ................................ 410/99; 410/32; 410/41; 410/155
(58) Field of Search ................................. 410/32, 34, 41, 410/155, 97, 99; 248/345.1, 499; 206/453, 586

(56) References Cited

U.S. PATENT DOCUMENTS

| D. 256,520 | 8/1980 | Dicarlo et al. . | |
|---|---|---|---|
| D. 261,327 | 10/1981 | Raye . | |
| 1,003,108 | * 9/1911 | Hinrichs | 410/41 |
| 1,873,887 | 8/1932 | Heppes . | |
| 3,378,889 | * 4/1968 | Dunderdale | 410/99 |
| 3,462,137 | * 8/1969 | Grube | 410/41 |
| 3,955,677 | 5/1976 | Collingwood . | |
| 4,887,946 | * 12/1989 | Sevier | 410/32 |
| 5,226,764 | * 7/1993 | Meriwether et al. | 410/99 |
| 5,575,412 | 11/1996 | Arias . | |
| 5,762,242 | 6/1998 | Yost . | |
| 5,848,865 | * 12/1998 | Beals | 410/99 |
| 5,980,173 | * 11/1999 | Danekas et al. | 410/99 |

* cited by examiner

*Primary Examiner*—Stephen T. Gordon

(57) ABSTRACT

A protective cargo support device for protecting cargo stacked for transporting. The protective cargo support device includes a pair of rigid elongate members having a rectangular structure and having ends, and further includes a plurality of ring members made of either rubber or plastic and being securely and removeably engaged about the rectangular structures and being interconnected by a pair of flexible members which have ends with each end being securely attached to a respective one of the ring members. The rigid elongate members are essentially made of wood and measure approximately 2 inches in depth and from approximately 4 inches to 6 inches in width.

11 Claims, 1 Drawing Sheet

PROTECTIVE CARGO SUPPORT DEVICE

BACKGROUND OF THE INVENTION

1. Field of the Invention

The present invention relates to a cargo corner cuff and more particularly pertains to a new protective cargo support device for protecting cargo stacked for transporting.

2. Description of the Prior Art

The use of cargo corner cuff is known in the prior art. More specifically, cargo corner cuff heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,955,677; U.S. Pat. No. Des. 261,327; U.S. Pat. No. 1,873,887; U.S. Pat. No. 5,226,764; U.S. Pat. No. 5,762,242; and U.S. Pat. No. 5,575,412.

While these devices fulfill their respective, particular objectives and requirements, the aforementioned patents do not disclose a new protective cargo support device. The inventive device includes a pair of rigid elongate members having a rectangular structure and having ends, and further includes a plurality of ring members made of either rubber or plastic and being securely and removeably engaged about the rectangular structures and being interconnected by a pair of flexible members which have ends with each end being securely attached to a respective one of the ring members. The rigid elongate members are essentially made of wood and measure approximately 2 inches in depth and from approximately 4 inches to 6 inches in width.

In these respects, the protective cargo support device according to the present invention substantially departs from the conventional concepts and designs of the prior art, and in so doing provides an apparatus primarily developed for the purpose of for protecting cargo stacked for transporting.

SUMMARY OF THE INVENTION

In view of the foregoing disadvantages inherent in the known types of cargo corner cuff now present in the prior art, the present invention provides a new protective cargo support device construction wherein the same can be utilized for protecting cargo stacked for transporting.

The general purpose of the present invention, which will be described subsequently in greater detail, is to provide a new protective cargo support device which has many of the advantages of the cargo corner cuff mentioned heretofore and many novel features that result in a new protective cargo support device which is not anticipated, rendered obvious, suggested, or even implied by any of the prior art cargo corner cuff, either alone or in any combination thereof.

To attain this, the present invention generally comprises a pair of rigid elongate members having a rectangular structure and having ends, and further includes a plurality of ring members made of either rubber or plastic and being securely and removeably engaged about the rectangular structures and being interconnected by a pair of flexible members which have ends with each end being securely attached to a respective one of the ring members. The rigid elongate members are essentially made of wood and measure approximately 2 inches in depth and from approximately 4 inches to 6 inches in width.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new protective cargo support device which has many of the advantages of the cargo corner cuff mentioned heretofore and many novel features that result in a new protective cargo support device which is not anticipated, rendered obvious, suggested, or even implied by any of the prior art cargo corner cuff, either alone or in any combination thereof.

It is another object of the present invention to provide a new protective cargo support device which may be easily and efficiently manufactured and marketed.

It is a further object of the present invention to provide a new protective cargo support device which is of a durable and reliable construction.

An even further object of the present invention is to provide a new protective cargo support device which is susceptible of a low cost of manufacture with regard to both materials and labor, and which accordingly is then susceptible of low prices of sale to the consuming public, thereby making such protective cargo support device economically available to the buying public.

Still yet another object of the present invention is to provide a new protective cargo support device which provides in the apparatuses and methods of the prior art some of the advantages thereof, while simultaneously overcoming some of the disadvantages normally associated therewith.

Still another object of the present invention is to provide a new protective cargo support device for protecting cargo stacked for transporting.

Yet another object of the present invention is to provide a new protective cargo support device which includes a pair of rigid elongate members having a rectangular structure and having ends, and further includes a plurality of ring members made of either rubber or plastic and being securely and removeably engaged about the rectangular structures and being interconnected by a pair of flexible members which have ends with each end being securely attached to a respective one of the ring members. The rigid elongate members are essentially made of wood and measure approximately 2 inches in depth and from approximately 4 inches to 6 inches in width.

Still yet another object of the present invention is to provide a new protective cargo support device that is easy and convenient to place about the corners of a stack of cargo.

Even still another object of the present invention is to provide a new protective cargo support device that substantially prevents the cargo from being damaged or ruined.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
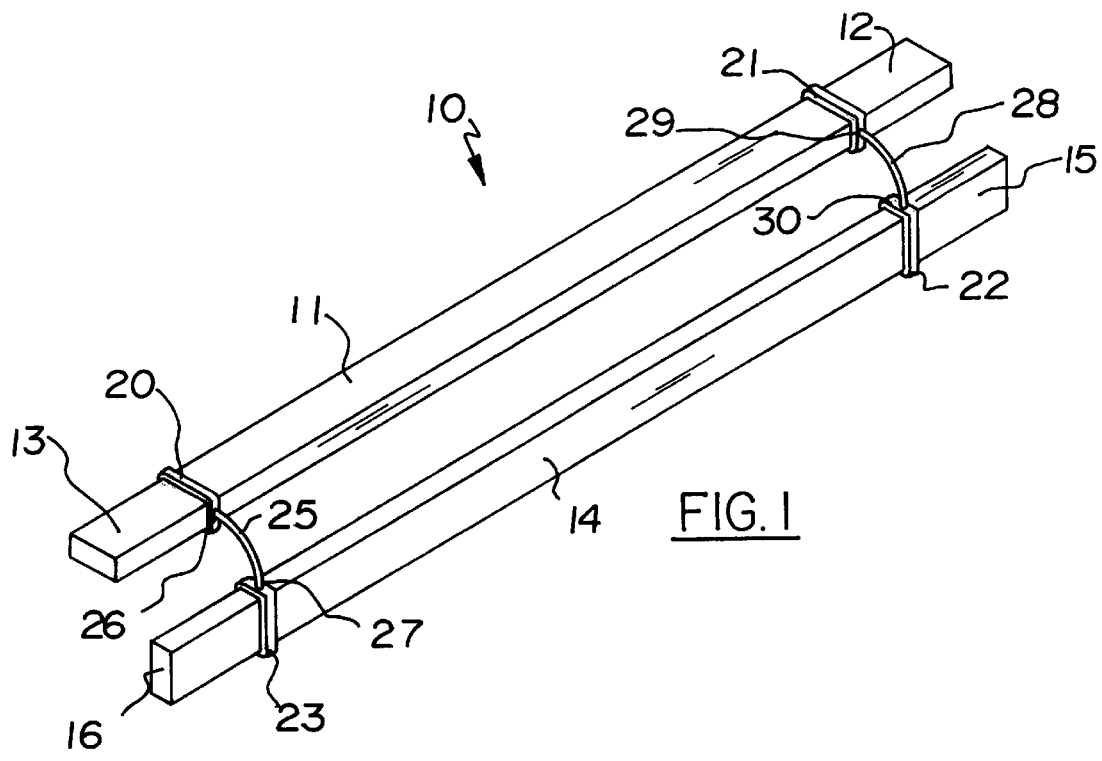
FIG. 1 is a perspective view of a new protective cargo support device according to the present invention.
Figure 2:
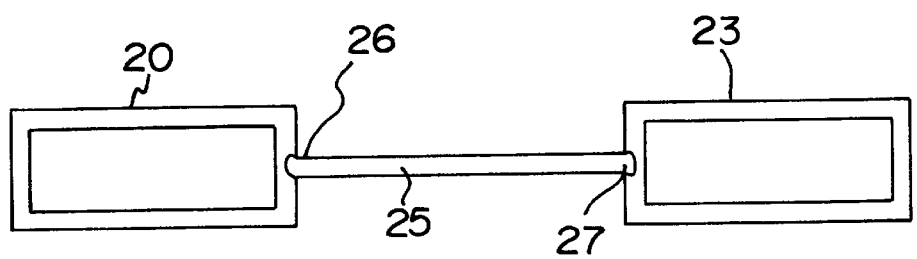
FIG. 2 is an end elevational view of the present invention.
Figure 3:
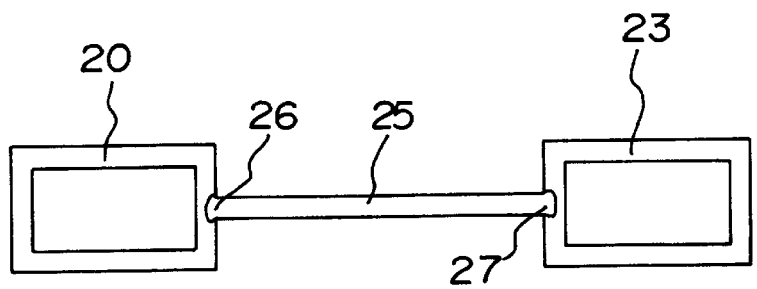
FIG. 3 is another end elevational view of the present invention.

With reference now to the drawings, and in particular to FIGS. 1 through 3 thereof, a new protective cargo support device embodying the principles and concepts of the present invention and generally designated by the reference numeral 10 will be described.

As best illustrated in FIGS. 1 through 3, the protective cargo support device 10 generally comprises a pair of rigid elongate members 11,14 with each of the elongate members 11,14 having either a rectangular structure or a tubular structure and having opposed ends 12,13,15,16. Each of the rigid elongate members 11,14 is made of wood and has a depth of approximately 2 inches and a width ranging from approximately 4 inches to approximately 6 inches. A plurality of ring members 20–23 are removeably engaged about the elongate members 11,14. Each of the ring members 20–23 is adapted to receive therethrough and engage about a respective one of the rectangular structures. Each of the ring members 20–23 is removeably and securely disposed near a respective one of the ends of the elongate members 11,14. A pair of flexible members 25,28 essentially interconnect the rigid elongate members 11,14 and have ends 26,27,29,30. Each of the ends 26,27,29,30 is securely and conventionally attached to a respective one of the ring members 20–23, all of which are adapted to protect and rest upon corners of stacks of cargo. Additionally, each of the flexible members 11,14 interconnect a respective pair of the ring members 20–23. As a first embodiment, the ring members 20–23 are made of rubber. As a second embodiment, the ring members 20–23 are made of plastic.

In use, the user takes the cargo support device 10 and places it on a corner of a stack of material such as lumber, and then the user wraps straps about the cargo and the cargo support device 10 to hold and secure the cargo upon a truck. In stead of the straps being wrapped about the cargo directly which made ruin and damage the cargo, the straps are wrapped about the cargo support device 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A protective cargo support device comprising:
   a pair of rigid elongate members;
   a plurality of ring members being removeably engaged about said elongate members; and
   a pair of flexible members having ends, each of said ends is securely attached to a respective one of said ring members, said flexible members interconnecting said elongate members which are adapted to protect and rest upon corners of stacks of cargo.

2. A protective cargo support device as described in claim 1, wherein each of said elongate members has a rectangular structure and has opposed ends.

3. A protective cargo support device as described in claim 2, wherein each of said ring members is adapted to receive therethrough and engage about a respective one of said rectangular structures.

4. A protective cargo support device as described in claim 3, wherein each of said ring members is removeably and securely disposed near a respective one of said ends of said elongate members.

5. A protective cargo support device as described in claim 4, wherein each of said flexible members interconnect a respective pair of said ring members.

6. A protective cargo support device as described in claim 5, wherein each of said rigid elongate members is made of wood and has a depth of approximately 2 inches and a width ranging from approximately 4 inches to approximately 6 inches.

7. A protective cargo support device as described in claim 5, wherein said ring members are made of rubber.

8. A protective cargo support device as described in claim 5, wherein said ring members are made of plastic.

9. A protective cargo support device comprising:

a pair of rigid elongate members, each of said elongate members having a rectangular structure and has opposed ends, each of said rigid elongate members being made of wood and having a depth of approximately 2 inches and a width ranging from approximately 4 inches to approximately 6 inches;

a plurality of ring members being removeably engaged about said elongate members, each of said ring members being adapted to receive therethrough and engage about a respective one of said rectangular structures, each of said ring members being removeably and securely disposed near a respective one of said ends of said elongate members; and a pair of flexible members having ends, each of said ends of said flexible members is securely attached to a respective one of said ring members, said flexible members interconnecting said elongate members which are adapted to protect and rest upon corners of stacks of cargo, each of said flexible members interconnecting a respective pair of said ring members.

10. A protective cargo support device as described in claim 9, wherein said ring members are made of rubber.

11. A protective cargo support device as described in claim 9, wherein said ring members are made of plastic.

* * * * *